United States Patent Office 2,813,080
Patented Nov. 12, 1957

2,813,080

LIQUID CONCENTRATES OF METAL DEACTIVATORS

Philip L. Bartlett, Wilmington, Del., assignor to E. I. du Pont de Nemours and Company, Wilmington, Del., a corporation of Delaware No Drawing. Application October 8, 1956,
Serial No. 614,345

18 Claims. (Cl. 252—403)

This invention relates to liquid concentrates of metal deactivator compounds having improved crystallization stabilities, and particularly to such concentrates in which the main active ingredient is N,N'-disalicylidene-1,2-propylenediamine and which contains an agent that greatly improves the stability thereof towards crystallization at low temperatures.

It is well known that Schiff's base type compounds, which are the condensation products of 2 mols of an o-hydroxy aromatic aldehyde or of an o-hydroxy aromatic ketone with 1 mol of an aliphatic polyamine which contains two primary amino groups, are effective metal deactivators in organic systems. That is, such compounds suppress the catalytic activity of metals on the oxidative degradation of organic substances, such as petroleum products, elastomers, fats, etc. Such metal deactivators, the methods of preparing them and their use have been disclosed by Downing et al. in Patent 2,181,121, Patent 2,255,597, Patent 2,284,267 and Patent 2,301,861.

In general, those metal deactivators are crystalline solids. For the addition thereof to organic substances, the metal deactivators are most conveniently and economically handled as liquids, that is in solution in suitable normally liquid organic solvents. Preferably, the solutions are highly concentrated to minimize cost and to avoid undue contamination of the organic substance by the solvent. Liquid aromatic hydrocarbons, such as benzene, toluene and the xylenes, are the most suitable in that they are efficient solvents, are inert in most organic substances, and are economically feasible.

Of the metal deactivators, N,N'-disalicylidene-1,2-propylenediamine (the condensation product of 2 mols of salicylaldehyde and 1 mol of 1,2-propylenediamine) is widely used commercially, particularly as a deactivator for copper. Generally, it has ben marketed and used as an 80% solution in a hydrocarbon solvent. However, it has been found that such solution has a great tendency to crystallize, especially at relatively low temperatures during storage or transportation. Therefore, less concentrated solutions, e. g., containing about 67% of the deactivator, have also been placed on the market. However, diluting the concentrates to such extent has not solved the problem, for these 67% and 80% solutions frequently solidify, partially or completely, during transportation or storage. When this occurs, the mixture must be heated to redissolve the deactivator, which constitutes a serious inconvenience to the user thereof, often entailing the installation of special facilities at additional expense.

It has been proposed to replace a part of the liquid hydrocarbon solvent of such concentrates by mixed xylenols. While the mixed xylenols tend to improve the crystallization stability of the concentrates, their use has not solved the problem to a satisfactory extent. Large amounts of the mixed xylenols render the viscosity of the concentrates prohibitively high, whereby it has been necessary to employ compromise amounts thereof which leave the crystallization problem unsolved.

It is an object of this invention to provide liquid concentrates of metal deactivators, in which N,N'-disalicylidene-1,2-propylenediamine predominates, having improved stability to crystallization. Another object is to provide liquid concentrates containing from about 60% to about 80% of an N,N'-disalicylidene-polyamine in a normally liquid hydrocarbon solvent, with or without a minor proportion of a lower alkylphenol, and a small proportion of at least one agent which renders the concentrates highly stable to crystallization. Further objects are to provide new compositions of matter and to advance the art. Still other objects will appear hereinafter.

The above objects may be accomplished by this invention which comprises the provision of liquid concentrates which consist essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with diethylenetriamine in a proportion of up to about 10 mol percent of the mixture, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of part of the said N,N'-disalicylidene-polyamine, and a solvent of the group consisting of normally liquid mononuclear aromatic hydrocarbons and mixtures thereof with lower alkylphenols, said hydrocarbons constituting at least 10% by weight of the concentrate and said alkylphenols, when present, constituting up to about 6% by weight of the concentrate.

The liquid concentrates, as above defined, have high stability to crystallization, that is, they are homogeneous liquids and are markedly resistant to the deposition of a solid phase under conditions that normally produce the oft-encountered objectionable crystallization and precipitation of the metal deactivator from solution. In other words, it has been found that, when from about 0.5% to about 10% by weight of o-hydroxyacetophenone is incorporated into the concentrates of the aforesaid N,N'-disalicylidene-polyamines, the tendency of the concentrates to crystallize is very greatly reduced or completely prevented under the conditions normally encountered during storage and transportation. The o-hydroxyacetophenone may replace a corresponding amount of the solvent, or a corresponding amount of the salicylaldehyde radical in the N,N'-disalicylidene-polyamine, or both.

The N,N'-disalicylidene-polyamines, which constitute the main metal deactivators or active ingredients of the compositions of this invention, are the condensation products of 2 mols of salicylaldehyde with 1 mol of 1,2-propylenediamine or with 1 mol of a mixture of 1,2-propylenediamine and diethylenetriamine in which the diethylenetriamine constitutes up to about 10 mol percent of the mixture of polyamines, preferably mixtures consisting of about 90 mol percent of 1,2-propylenediamine and about 10 mol percent of diethylenetriamine. These N,N'-disalicylidene-polyamines are prepared by the methods known to the art, such as Patent 2,181,121. The product from 1,2-propylenediamine is N,N'-disalicylidene-1,2-propylenediamine. The product from the mixture of polyamines is a mixture of N,N'-disalicylidene-1,2-propylenediamine and N,N'-disalicylidenediethylenetriamine in a molar proportion corresponding to the molar proportions of the polyamines in the mixture thereof employed. The preferred N,N'-disalicylidene-polyamines in the compositions of this invention are the mixtures prepared from the mixtures of polyamines, particularly the mixture obtained from the mixture of about 90 mol percent of 1,2-propylenediamine and about 10 mol percent of diethylenetriamine. While commercially available polyamines, other than 1,2-propylenediamine, generally yield products of lower activity as metal deactivators, up to about 10 mol percent of diethylenetriamine does not materially affect the metal deactivating activity of the product. On the other hand, such amounts of diethylenetriamine in the product decreases, to a significant extent, the crystallization tendency of concentrates thereof.

The solvent employed in the compositions (concentrates) of this invention are the normally liquid mononuclear aromatic hydrocarbons or mixtures thereof with lower alkylphenols, said hydrocarbons constituting at least 10% by weight of the composition. Such aromatic hydrocarbons include particularly benzene, toluene, o-xylene, m-xylene, p-xylene and mixtures of any two or more thereof. Of these, the xylenes will be preferred, particularly the commercial mixed xylenes, primarily because they are less noxious and present less of a fire hazard. When the terms "mixed xylenes" or "xylenes" are used hereinafter, it will be understood that the commercially available mixtures of the various xylenes are meant.

Preferably, the solvent will be a mixture of the aforesaid aromatic hydrocarbons with at least one lower alkylphenol. The term "alkylphenol" is used in its strict sense to mean phenol substituted on the ring by one or more alkyl groups. The term "lower alkylphenol" will be understood to mean those in which there is a total of 1 to 4 carbon atoms in the alkyl groups. Representative lower alkylphenols are the cresols, the xylenols, the ethylphenols, and mixtures of any two or more thereof, such as the commercially available mixed xylenols, mixed cresols and the petroleum cresylic acids. The petroleum cresylic acids are mixtures, predominantly of cresols, ethylphenols and xylenols. It is usually preferred to employ the commercial mixtures of xylenols, and the terms "mixed xylenols" and "xylenols," as employed hereinafter, will be understood to mean such mixtures of xylenols.

While the lower alkylphenols are, in general, excellent solvents for the metal deactivators, they are impractical for use as the sole solvents for concentrates of the metal deactivators because such concentrates are impractically viscous. Also, as pointed out heretofore, large amounts of these alkylphenols in the solvent mixtures render the concentrates objectionably viscous. However, the lower alkylphenols may be present in proportions up to about 6% by weight of the concentrates of this invention without increasing the viscosity of the concentrates to an objectionable extent. While the alkylphenols alone are impractical for increasing the crystallization stability of the concentrates to the desired extent, they are desirable in the concentrates for such effect as they do have thereon and particularly because they make it possible to obtain optimum results with smaller quantities of the o-hydroxyacetophenone or the radical thereof. Usually, the lower alkylphenol will be present in an amount to constitute from about 2% to about 6% of the concentrate, preferably about 6%.

The crystallization stability of the concentrates are improved according to this invention by incorporating therein from about 0.5% to about 10% by weight thereof of o-hydroxyacetophenone, as the free ketone (uncombined) or as an equivalent proportion of the radical thereof in the metal deactivator compound, or both. Materially smaller proportions thereof do not increase the crystallization stability of the concentrates to a satisfactory extent. Materially more than 10% of the o-hydroxyacetophenone or equivalent of the radical thereof has no advantage, is wasteful and, if combined in the metal deactivator compound, may cause crystallization. The proportions required for optimum results will be dependent primarily on the presence or absence of alkylphenols and the amounts thereof. When the aromatic hydrocarbons constitute the sole solvent (no alkylphenol present), it will be preferred to employ from about 3% to about 7.5% by weight of o-hydroxyacetophenone or equivalent amount of the radical thereof, particularly about 5%, to inhibit substantially completely the precipitation of a solid phase under conditions which normally cause the precipitation of rather large quantities of the metal deactivator or the substantially complete solidification of the mass. Where the solvent contains a lower alkylphenol particularly in a concentration of about 6% of the concentrate, it will be preferred to employ from about 0.5% to about 2% by weight of o-hydroxyacetophenone or an equivalent amount of the radical thereof. Other carbonyl compounds, such as salicylaldehyde and benzaldehyde, have little or no effect on the crystallization stability of the concentrates and cannot be substituted for the o-hydroxyacetophenone.

The compositions or concentrates of this invention may be prepared by a variety of procedures, e. g., (1) adding the desired amount of o-hydroxyacetophenone to the solvent before dissolving the N,N'-disalicylidene-polyamine therein or to the concentrated solution, (2) reacting a mixture of salicylaldehyde and o-hydroxyacetophenone in the desired proportions with the polyamine to produce the metal deactivator compounds, and (3) mixing the desired proportion of separately prepared N,N'-di(o-hydroxyacetophenone)-polyamine or a solution thereof with the N,N'-disalicylidene-polyamine or with a solution thereof. The N,N'-di(o-hydroxyacetophenone)-polyamines, prepared from 1,2-propylenediamine or from mixtures of 1,2-propylenediamine and 10 mol percent of diethylenetriamine, are as effective metal deactivators as the corresponding N,N'-disalicylidene-polyamines, whereby their inclusion in the concentrates does not diminish the metal deactivating properties of the compositions. On the other hand, the o-hydroxyacetophenone radicals, present in the metal deactivator compounds of the compositions produced by procedures (2) and (3), appear to be as effective as an equivalent proportion of free o-hydroxyacetophenone in improving the crystallization stability of the concentrates.

For reasons of convenience and economy, it is preferred to employ procedure (1), that is, to add free o-hydroxyacetophenone to a concentrated solution of the N,N'-disalicylidene-polyamine or to substitute the desired amount of free o-hydroxyacetophenone for a corresponding amount of the aromatic hydrocarbon solvent before dissolving the N,N'-disalicylidene-polyamine therein. These compositions may be considered most simply as consisting essentially of N,N'-disalicylidene-polyamine, free o-hydroxyacetophenone, and the solvent. However, it is probable that these compositions are more complex in that o-hydroxyacetophenone is capable of entering into the N,N'-disalicylidene-polyamine molecule by replacing one or both of the salicylidene radicals of a portion of the N,N'-disalicylidene-polyamine, liberating free salicylaldehyde and forming one or both of N,N'-(o-hydroxyacetophenone)(salicylidene)-polyamine and N,N'-di(o-hydroxyacetophenone)-polyamine. It is believed that such exchange reaction does take place to some extent to produce an equilibrium mixture. This is consistent with the results produced by samples 2, 8 and 10 of Example 3, which appears hereinafter.

In procedure (2), about 1 to about 1.18 mols of a mixture, consisting of salicylaldehyde and o-hydroxyacetophenone containing about 0.0065 to about 0.18 mol of o-hydroxyacetophenone, is reacted with 0.5 mol of the polyamine, and the water of reaction is removed. These quantities of o-hydroxyacetophenone correspond to 0.5% to 10% by weight of 60 to 80% solutions of the condensation product. The product is predominantly N,N'-disalicylidene-polyamine mixed with one or both of N,N'-di(o-hydroxyacetophenone)-polyamine and N,N'-(o-hydroxyacetophenone)(salicylidene)-polyamine, probably both in random proportions, and, when excess carbonyl compound is employed in the reaction, up to 10% by weight of one or both of free salicylaldehyde and free o-hydroxyacetophenone based on the concentrates to be prepared. Such product is dissolved in a concentration of about 60% to about 80% by weight in the aromatic hydrocarbon solvent or, preferably, in a mixture of the aromatic hydrocarbon solvent and a lower alkylphenol. Such concentrates have high stability to crystallization, substantially equal to that obtained by adding, to corresponding concentrated solutions of the N,N'-disalicylidene-polyamine, free o-hydroxyacetophenone in an amount equal to that employed in admixture with the salicylaldehyde. If desired, only part of the required amount of o-hydroxyacetophenone may be employed in the reaction with the polyamine, and the rest added to the concentrate as free o-hydroxyacetophenone.

In procedure (3), N,N'-disalicylidene-polyamine and N,N'-di(o-hydroxyacetophenone)-polyamine are separately prepared from 1,2-propylenediamine or mixtures of 1,2-propylenediamine and up to 10 mol percent of diethylenetriamine, and the two compounds mixed in such proportions that the amount of o-hydroxyacetophenone radical therein is equivalent to about 0.5 to about 10 parts by weight of o-hydroxyacetophenone for every 100 parts of the concentrate to be prepared therefrom. The compounds may be mixed by conventional procedures and the mixture then dissolved in the solvent in a concentration of about 60% to about 80% by weight. Alternatively, the compounds may be separately added to the solvent and dissolved therein, or each may be dissolved in a separate portion of the solvent and the two solutions mixed. The concentrates so prepared have crystallization stabilities substantially equal to corresponding concentrates prepared by procedure (1) with an equivalent proportion of free o-hydroxyacetophenone. Also, if desired, only a part of the required o-hydroxyacetophenone may be incorporated as the N,N'-di(o-hydroxyacetophenone)-polyamine and the rest added as free o-hydroxyacetophenone.

In order to more clearly illustrate this invention, preferred modes of carrying it into effect, and the advantageous results to be obtained thereby, the following examples are given in which the quantities are by weight except where otherwise indicated:

EXAMPLE 1

N,N'-disalicylidene-1,2-propylenediamine was prepared by the general method known to the art, e. g.: One-half mol 1,2-propylenediamine was added slowly to one mol of salicylaldehyde while stirring and maintaining the reaction mass at temperatures below 60° C. The reaction mass was heated to and held at 60–70° C. for 0.5 hour. The water produced in the reaction was stripped in vacuo, at temperatures up to 90° C., in a slow stream of nitrogen gas delivered beneath the surface of the mass.

Concentrates were prepared by mixing N,N'-disalicylidene-1,2-propylenediamine (as prepared above), mixed xylenes, and o-hydroxyacetophenone in the proportions indicated in Table I below; the mixture was stirred and warmed to 125° F. until solution was complete.

The crystallization stabilities of the concentrates were determined as follows: Two-ounce samples in glass bottles were seeded at about 70° F. with small crystals of N,N'-disalicylidene-1,2-propylenediamine and then stored at 12° F. for 168 hours. The extent of crystallization was estimated visually as approximate percent of the original volume which had crystallized. The compositions and the test results are shown in Table I:

Table I

| Test | A. I.[1] | Composition, Percent by weight | | Percent Crystallized |
|---|---|---|---|---|
| | | Xylenes | o-hydroxy-acetophenone | |
| 1 | 80 | 20 | --------- | 100 |
| 2 | 80 | 19.9 | 0.1 | 70–80 |
| 3 | 80 | 19 | 1.0 | 15–20 |
| 4 | 80 | 15 | 5.0 | 5–10 |
| 5 | 80 | 10 | 10.0 | 5 |

[1] N,N'-disalicylidene-1,2-propylenediamine.

The data shows that o-hydroxyacetophenone has a marked effect in inhibiting the formation of crystals under rather extreme cold-storage conditions. When tests 4 and 5 were repeated using salicylaldehyde in place of the o-hydroxyacetophenone, the percent crystallization was reduced to only 60%.

EXAMPLE 2

The test procedure of Example 1 was repeated, using n,n'-disalicylidene-1,2-propylenediamine as the active ingredient (A. I.) and toluene or benzene as the solvent. The results obtained are summarized in Table II:

Table II

| Test | A. I. | Composition, Percent by weight | | | Percent crystallized |
|---|---|---|---|---|---|
| | | Toluene | Benzene | o-hydroxy-acetophenone | |
| 6 | 65 | 35 | --------- | --------- | 20–25 |
| 7 | 65 | 30 | --------- | 5 | 0 |
| 8 | 80 | --------- | 20 | --------- | 10–15 |
| 9 | 80 | --------- | 15 | 5 | 3–5 | o-Hydroxyacetophenone completely inhibits crystal formation in the toluene solution and affords considerable improvement in the more concentrated benzene solution.

EXAMPLE 3

The test procedure of Example 1 was employed with various compositions (samples) prepared by dissolving several active ingredients in a commercial mixture of xylenes (xylenes) and mixtures of said xylenes with one of o-hydroxyacetophenone (ketone) or salicylaldehyde (aldehyde), and visually estimating the percent of the original volume which had crystallized during the test (percent cryst.).

The active ingredients were:

SPD—N,N'-disalicylidene-1,2-propylenediamine
APD—The condensation product of a 1 mol of o-hydroxyacetophenone with 0.5 mol of 1,2-propylenediamine
SAPD—The condensation product of 1 mol of a mixture of 0.05 mol (about 3.8 parts by weight) of o-hydroxyacetophenone and 0.95 mol of salicylaldehyde with 0.5 mol of 1,2-propylenediamine which condensation product was predominantly N,N'-disalicylidene-1,2-propylenediamine mixed with a small proportion of one or both of N,N'-di(o-hydroxyacetophenone)-1,2-propylenediamine and N,N'-(o-hydroxyacetophenone)(salicylidene)-1,2-propylenediamine and a blend of separately prepared SPD and APD in the ratio of 75.7 parts of SPD and 4.3 parts of APD which contains the o-hydroxyacetophenone radical in an amount equivalent to about 3.77 parts by weight of o-hydroxyacetophenone.

The compositions of the samples and the results obtained were shown in the following Table III:

Table III

[Percent Crystallization at 12° F. in 168 hours.]

| Sample | Added Components | | | Active Ingredient | | | Percent Cryst. |
|---|---|---|---|---|---|---|---|
| | Xylenes, Wt. Percent | Aldehyde, Wt. Percent | Ketone, Wt. Percent | SPD, Wt. Percent | APD, Wt. Percent | SAPD, Wt. Percent | |
| 1 | 20 | --------- | --------- | 80 | --------- | --------- | 70 |
| 2 | 16.5 | --------- | 3.5 | 80 | --------- | --------- | 5 |
| 3 | 16.8 | 3.2 | --------- | 80 | --------- | --------- | 50 |
| 4 | 20 | --------- | --------- | --------- | 80 | --------- | 100 |
| 5 | 16.5 | --------- | 3.5 | --------- | 80 | --------- | 100 |
| 6 | 16.8 | 3.2 | --------- | --------- | 80 | --------- | 100 |
| 7 | 20 | --------- | --------- | --------- | --------- | 80 | 1 |
| 8 | 16.8 | 3.2 | --------- | --------- | --------- | 80 | 7 |
| 9 | 20 | --------- | --------- | 75.7 | 4.3 | --------- | 3 |
| 10 | 16.8 | 3.2 | --------- | 75.7 | 4.3 | --------- | Slight |
| 11 | 16.5 | --------- | 3.5 | 75.7 | 4.3 | --------- | Trace |

Samples 1, 3, 4, 5 and 6 are given for comparison purposes solely. Sample 1 is the control. The apparent differences between the percent crystallization of sample 1 and the control of Example 1 may be explained by the inherent difficulty of visual estimation of liquid in a mixture which is composed so largely of crystalline material, the presence of unobserved occluded liquid in the control of Example 1, and differences in the history and relative purity of the active ingredient. Sample 3 shows that while salicylaldehyde has some effect, it is relatively ineffective and is not an equivalent of o-hydroxyacetophenone. Benzaldehyde gave no improvement in crystallization stability.

Samples 4, 5 and 6 show that concentrates of the condensation product of o-hydroxyacetophenone with 1,2-propylenediamine have very poor crystallization stability, and are not improved in this respect by the addition of small proportions of salicylaldehyde or o-hydroxyacetophenone. However, as shown by samples 9-11, the addition of small amounts of such condensation product (equivalent to replacing both salicylaldehyde radicals in 4.3 parts of 80 parts of N,N'-disalicylidene-1,2-propylenediamine with o-hydroxyacetophenone) to the N,N'-disalicylidene-1,2-propylenediamine greatly increases the crystallization stability of concentrates of the latter compound, being equal in effect to an amount of free o-hydroxyacetophenone equivalent to the amount of o-hydroxyacetophenone radical present in the condensation product. Sample 2 (prepared by incorporating 3.5% free o-hydroxyacetophenone in the N,N'-disalicylidene-1,2-propylene concentrate) and samples 7, 8, 9 and 10 (containing the o-hydroxyacetophenone radical in place of one or both of the salicylaldehyde radicals in proportions equivalent to about 3.8 parts of o-hydroxyacetophenone) had comparable crystallization stabilities, whereby it is apparent that the o-hydroxyacetophenone is as effective when it is present as such radical as when it is present as the free compound.

EXAMPLE 4

A liquid metal deactivator composition consisting of 80% N,N'-disalicylidene-1,2-propylenediamine, 14% mixed xylenes and 6% mixed xylenols was prepared by the methods described in Example 1. To one portion of this concentrate was added 0.5% of o-hydroxyacetophenone. To the second portion was added an additional 0.5% of mixed xylenes. Both samples were seeded with a few small crystals of pure N,N'-disalicylidene-1,2-propylenediamine and then stored in glass bottles at 37° F. The samples were examined daily for crystal growth. Crystal growth started in the control sample in less than 24 hours and the entire sample had set to a solid crystalline mass in 72 hours. The sample, to which had been added 0.5% of o-hydroxyacetophenone, however, had crystallized only to the extent of about 2% in 72 hours.

EXAMPLE 5

A mixture of N,N'-disalicylidene-1,2-propylenediamine and N,N'disalicylidene-diethylenetriamine was prepared by the method described in Example 1 by reacting 1 mol of salicylaldehyde with 0.5 mol of a mixture consisting of 90 mol percent of 1,2-propylenediamine and 10 mol percent of diethylenetriamine. This mixture of metal deactivators was divided into two portions. One portion was diluted with mixed xylenes and mixed xylenols to give composition (I) containing 80% of the active ingredient, 14% xylenes and 6% xylenols. The second portion was diluted to give composition (II) corresponding to 80% of the above metal deactivator, 13.5% xylenes, 6% mixed xylenols and 0.5% o-hydroxyacetophenone. The homogeneous liquid concentrates I and II were seeded at 70° F. with small crystals of N,N'-disalicylidene-1,2-propylenediamine and then stored in a refrigerator at 30° F.

In less than 24 hours, crystals began to form in concentrate I and, at the end of 120 hours, approximately 3% of the concentrate had crystallized.

Concentrate II (containing o-hydroxyacetophenone) showed slight signs of crystallization after 48 hours and, at the end of 120 hours, had deposited a negligible quantity of precipitate, estimated at less than 1% of the total charge.

EXAMPLE 6

Following the procedures described in Example 1, a concentrate was prepared from the following components in the quantities given below:

| | Weight percent |
|---|---|
| N,N'-disalicylidene-1,2-propylenediamine | 80 |
| Mixed xylenes | 16 |
| Mixed xylenols | 2 |
| o-Hydroxyacetophenone | 2 |

This concentrate alone, with a similar concentrate as a control (containing no added o-hydroxyacetophenone) was stored at 37° F. after being seeded with crystals of the active ingredient. At the end of 24 hours, the control was already a solid mass. At the end of 96 hours, the concentrate containing o-hydroxyacetophenone was still completely liquid.

It will be understood that the preceding examples are given for illustrative purposes solely, and that this invention is not limited to the specific embodiments disclosed therein. The materials, the proportions thereof, and the procedures for preparing the concentrates may be widely varied as indicated in the general description without departing from the spirit or scope of this invention.

From the preceding description, it will be apparent that this invention solves a serious problem in the art, providing novel compositions which are concentrates of N,N'-disalicylidene-1,2-propylenediamine, predominantly, that are unusually resistant to crystallization and the deposition of a solid phase under conditions which normally cause extensive crystallization and deposition of solids by prior concentrates of that compound. Thus, this invention constitutes a valuable advance in and contribution to the art.

The embodiments of this invention in which an exclusive property or privilege is claimed are defined as follows:

1. A liquid concentrate of high stability to crystallization which consists essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with up to about 10 mol % of diethylenetriamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, and a solvent of the group consisting of normally liquid mononuclear aromatic hydrocarbons and mixtures thereof with lower alkylphenols, said hydrocarbons constituting at least 10% by weight of the concentrate and said alkylphenols, when present, constituting up to about 6% by weight of the concentrate.

2. A liquid concentrate of high stability to crystallization which consists essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with up to about 10 mol % of diethylenetriamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, from about 2% to about 6% by weight of at least one lower alkylphenol, and at least 10% by weight of at least one normally liquid mononuclear aromatic hydrocarbon.

3. A liquid concentrate of high stability to crystallization which consists essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with up to about 10 mol % of diethylenetriamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, from about 2% to about 6% by weight of mixed xylenols, and at least 10% by weight of at least one normally liquid mononuclear aromatic hydrocarbon.

4. A liquid concentrate of high stability to crystallization which consists essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with up to about 10 mol % of diethylenetriamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, about 6% by weight of mixed xylenols, and at least 10% by weight of mixed xylenes.

5. A liquid concentrate of high stability to crystallization which consists essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with up to about 10 mol % of diethylenetriamine, from about 0.5% to about 2% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, about 6% by weight of mixed xylenols, and at least 10% by weight of mixed xylenes.

6. A liquid concentrate of high stability to crystallization which consists essentially of about 80% by weight of an N,N'-disalicylidene-polyamine which is the condensation product of 2 mols of silacylaldehyde with 1 mol of a member of the group consisting of 1,2-propylenediamine and mixtures of 1,2-propylenediamine with up to about 10 mol % of diethylenetriamine, from about 0.5% to about 2% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, about 6% by weight of mixed xylenols, and at least 10% by weight of mixed xylenes.

7. A liquid concentrate of high stability to crystallization which consists essentially of from about 60% to about 80% by weight of N,N'-disalicylidene-1,2-propylenediamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-1,2-propylenediamine, and a solvent of the group consisting of normally liquid mononuclear aromatic hydrocarbons and mixtures thereof with lower alkylphenols, said hydrocarbons constituting at least 10% by weight of the concentrate and said alkylphenols, when present, constituting up to about 6% by weight of the concentrate.

8. A liquid concentrate of high stability to crystallization which consists essentially of from about 60% to about 80% by weight of N,N'-disalicylidene-1,2-propylenediamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-1,2-propylenediamine, from about 2% to about 6% by weight of mixed xylenols, and at least 10% by weight of at least one normally liquid mononuclear aromatic hydrocarbon.

9. A liquid concentrate of high stability to crystallization which consists essentially of from about 60% to about 80% by weight of an N,N'-disalicylidene-polyamine which is the condensation product of 2 mols of salicylaldehyde with 1 mol of a mixture of 1,2-propylenediamine with up to about 10 mol percent of diethylenetriamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, and a solvent of the group consisting of normally liquid mononuclear aromatic hydrocarbons and mixtures thereof with lower alkylphenols, said hydrocarbons constituting at least 10% by weight of the concentrate and said alkylphenols, when present, constituting up to about 6% by weight of the concentrate.

10. A liquid concentrate of high stability to crystallization which consists essentially of from about 60% to about 80% by weight of an N,N'-disalicylidene-polyamine which is the condensation product of 2 mols of salicylaldehyde with 1 mol of a mixture of 1,2-propylenediamine with up to about 10 mol percent of diethylenetriamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, from about 2% to about 6% by weight of at least one lower alkylphenol, and at least 10% by weight of at least one normally liquid mononuclear aromatic hydrocarbon.

11. A liquid concentrate of high stability to crystallization which consists essentially of about 80% by weight of an N,N'-disalicylidene-polyamine which is the condensation product of 2 mols of salicylaldehyde with 1 mol of a mixture of 1,2-propylenediamine with up to about 10 mol percent of diethylenetriamine, from about 0.5% to about 2% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, about 6% by weight of mixed xylenols, and at least 10% by weight of mixed xylenes.

12. A liquid concentrate of high stability to crystallization which consists essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with up to about 10 mol percent of diethylenetriamine, from about 0.5% to about 10% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, and at least 10% by weight of at least one normally liquid mononuclear aromatic hydrocarbon.

13. A liquid concentrate of high stability to crystallization which consists essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with up to about 10 mol percent of diethylenetriamine, from about 0.5% to about 10% by weight of o-hydroxyacetophenone which is present as at least one member of the group consisting of free o-hydroxyacetophenone and o-hydroxyactophenone radicals replacing at least one salicylaldehyde radical of a portion of the said N,N'-disalicylidene-polyamine, and at least 10% by weight of mixed xylenes.

14. A liquid concentrate of high stability to crystallization which consists essentially of from about 60% to about 80% by weight of an N,N'-disalicylidene-polyamine which is the condensation product of 2 mols of salicylaldehyde with 1 mol of a member of the group consisting of 1,2-propylenediamine and mixtures of 1,2-propylenediamine with up to about 10 mol percent of diethylenetriamine, from about 3% to about 7.5% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, and at least 10% by weight of at least one normally liquid mononuclear aromatic hydrocarbon.

15. A liquid concentrate of high stability to crystallization which consists essentially of from about 60% to about 80% by weight of N,N'-disalicylidene-1,2-propylenediamine, from about 3% to about 7.5% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-1,2-propylenediamine, and at least 10% by weight of at least one normally liquid mononuclear aromatic hydrocarbon.

16. A liquid concentrate of high stability to crystallization which consists essentially of from about 60% to about 80% by weight of N,N'-disalicylidene-1,2-propylenediamine, from about 3% to about 7.5% by weight of o-hydroxyacetophenone which is present as at least one member of the group consisting of free o-hydroxyacetophenone and o-hydroxyacetophenne radicals replacing at least one salicylaldehyde radical of a portion of the said N,N'-disalicylidene-1,2-propylenediamine, and at least 10% by weight of mixed xylenes.

17. A liquid concentrate of high stability to crystallization which consists essentially of from about 60% to about 80% by weight of an N,N'-disalicylidene-polyamine which is the condensation product of 2 mols of salicylaldehyde with 1 mol of a mixture of 1,2-propylenediamine with up to about 10 mol percent of diethylenetriamine, from about 3% to about 7.5% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, and at least 10% by weight of at least one normally liquid mononuclear aromatic hydrocarbon.

18. A liquid concentrate of high stability to crystallization which consists essentially of from about 60% to about 80% by weight of an N,N'-disalicylidene-polyamine which is the condensation product of 2 mols of salicylaldehyde with 1 mol of a mixture of 1,2-propylenediamine with up to about 10 mol percent of diethylenetriamine, from about 3% to about 7.5% by weight of o-hydroxyacetophenone which is present as at least one member of the group consisting of free o-hydroxyacetophenone and o-hydroxyacetophenone radicals replacing at least one salicylaldehyde radical of a portion of the said N,N'-disalicylidene-polyamine, and at least 10% by weight of mixed xylenes.

References Cited in the file of this patent
UNITED STATES PATENTS

| | | |
|---|---|---|
| 2,181,121 | Downing et al. | Nov. 28, 1939 |
| 2,301,861 | Downing et al. | Nov. 10, 1942 |
| 2,426,206 | Hamilton et al. | Aug. 26, 1947 |